United States Patent
Maeng et al.

(10) Patent No.: US 9,787,942 B2
(45) Date of Patent: Oct. 10, 2017

(54) APPARATUS AND METHOD FOR SETTING UP PARALLEL CALL SESSION BASED ON 3-BOX ARCHITECTURE

(75) Inventors: Je-Young Maeng, Gyeonggi-do (KR); Joo-Yeol Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 842 days.

(21) Appl. No.: 13/591,864

(22) Filed: Aug. 22, 2012

(65) Prior Publication Data

US 2013/0050397 A1 Feb. 28, 2013

(30) Foreign Application Priority Data

Aug. 22, 2011 (KR) ........................ 10-2011-0083395

(51) Int. Cl.
| | |
|---|---|
| H04N 7/14 | (2006.01) |
| H04N 21/41 | (2011.01) |
| H04N 21/431 | (2011.01) |
| H04N 21/4788 | (2011.01) |
| H04L 29/06 | (2006.01) |

(52) U.S. Cl.
CPC ......... *H04N 7/148* (2013.01); *H04L 65/1006* (2013.01); *H04L 65/1069* (2013.01); *H04L 65/1083* (2013.01); *H04L 65/4015* (2013.01); *H04N 21/4126* (2013.01); *H04N 21/4316* (2013.01); *H04N 21/4788* (2013.01)

(58) Field of Classification Search
USPC ..... 348/14.01, 14.02, 14.08, 14.12; 370/328, 370/352, 252; 709/228
See application file for complete search history.

(56) References Cited

U.S. PATENT DOCUMENTS

| | | | |
|---|---|---|---|
| 7,092,698 B1 | 8/2006 | Sharp et al. | |
| 2005/0149876 A1 | 7/2005 | Kortum et al. | |
| 2007/0263075 A1* | 11/2007 | Nimri et al. | ............... 348/14.08 |
| 2007/0291736 A1* | 12/2007 | Furlong | ............. H04L 12/2803 370/352 |
| 2007/0291927 A1 | 12/2007 | Batni et al. | |

(Continued)

FOREIGN PATENT DOCUMENTS

| | | |
|---|---|---|
| CN | 1344455 | 4/2002 |
| CN | 101094130 | 12/2007 |

(Continued)

OTHER PUBLICATIONS

Yoshiki Nishikawa et al., "Telephony Architecture", XP055181532, Mar. 22, 2011.

(Continued)

*Primary Examiner* — Joseph J Nguyen
(74) *Attorney, Agent, or Firm* — The Farrell Law Firm, P.C.

(57) ABSTRACT

Methods and apparatus are provided for establishing a parallel call session based on a 3-Box architecture. Connection information of a first electronic device is received from a first control point. A video call request message is generated for requesting setup for a video call. The video call request message includes the connection information of the first electronic device. The video call request message is sent to a second mobile device. The connection information of the first electronic device is transmitted to a second control point, to request video call setup.

15 Claims, 6 Drawing Sheets

(56) References Cited

U.S. PATENT DOCUMENTS

| | | | |
|---|---|---|---|
| 2008/0024593 A1* | 1/2008 | Tsirinsky | H04N 7/148 348/14.08 |
| 2008/0111880 A1* | 5/2008 | Lee | 348/14.1 |
| 2008/0281926 A1* | 11/2008 | Walter | H04N 7/163 709/206 |
| 2009/0055879 A1* | 2/2009 | Wang | H04L 29/06027 725/93 |
| 2009/0135806 A1 | 5/2009 | Pulhug | |
| 2009/0161843 A1 | 6/2009 | Sylvain | |
| 2009/0181657 A1 | 7/2009 | Ramanathan et al. | |
| 2009/0190736 A1* | 7/2009 | Bertin | H04L 65/1069 379/202.01 |
| 2009/0325642 A1* | 12/2009 | Schuler | G06F 3/1454 455/566 |
| 2010/0040211 A1 | 2/2010 | Maeng et al. | |
| 2010/0098056 A1 | 4/2010 | Falkena et al. | |
| 2010/0110978 A1* | 5/2010 | Falken et al. | 370/328 |
| 2010/0157013 A1* | 6/2010 | Sylvain | 348/14.01 |
| 2010/0278171 A1* | 11/2010 | Ku | H04L 65/1016 370/352 |
| 2010/0284398 A1* | 11/2010 | Maeng | H04L 12/2838 370/352 |
| 2011/0085648 A1 | 4/2011 | Maeng et al. | |
| 2011/0116496 A1 | 5/2011 | Maeng et al. | |
| 2011/0221858 A1* | 9/2011 | Laiho et al. | 348/14.02 |
| 2012/0013703 A1* | 1/2012 | Maeng | H04N 7/148 348/14.02 |

FOREIGN PATENT DOCUMENTS

| | | |
|---|---|---|
| CN | 101511072 | 8/2009 |
| KR | 1020100021342 | 2/2010 |
| KR | 1020100021386 | 2/2010 |
| KR | 1020110051122 | 5/2011 |

OTHER PUBLICATIONS

European Search Report dated Apr. 15, 2015 issued in counterpart application No. 12825401.8-1853.

Rosenberg, Network Working Group, SIP: Session Initiation Protocol, RFC3261, Jun. 30, 2002, 139 pages.

Chinese Office Action dated Nov. 4, 2015 issued in counterpart application No. 201280040538.4, 16 pages.

* cited by examiner

APPARATUS AND METHOD FOR SETTING UP PARALLEL CALL SESSION BASED ON 3-BOX ARCHITECTURE

PRIORITY

This application claims priority under 35 U.S.C. §119(a) to a Korean Patent Application filed in the Korean Intellectual Property Office on Aug. 22, 2011 and assigned Serial No. 10-2011-0083395, the entire disclosure of which is incorporated herein by reference.

BACKGROUND OF THE INVENTION

1. Field of the Invention

The present invention relates generally to a session setup apparatus and a method capable of invoking setting functions between mobile phones, and more particularly, to an apparatus and method for setting up a direct session between another party's Television (TV) and a TV belonging to the network to which a user belongs.

2. Description of the Related Art

Value-added services, other than voice call services, have been developed in the mobile phone market, and have enabled users to freely enjoy video calls.

Mobile services have extended their coverage into the home, leading to the emergence of Universal Plug and Play (UPnP) Telephony, in which a user may enjoy the features of his/her mobile phone through a home electronic device, such as, for example, a TV.

UPnP Telephony links electronic devices to telephony devices, and allows a user to make or receive phone calls using, for example, a home TV, regardless of the type of telephony device.

UPnP Telephony may advantageously interwork with a Mobile Telephony Service, as well as an existing telephony technologies, such as, for example, Voice over Internet Protocol (VoIP) and Public Switched Telephone Network (PSTN). UPnP is likely to be adopted as the next standard of the Digital Living Network Alliance (DLNA) since it has the same infrastructure (e.g., UPnP device architecture) as DLNA, which is the de facto standard for home media sharing.

Technology having coverage that is similar to that of UPnP Telephony may include, for example, Session Initiation Protocol (SIP)-based Gm*, which is standardized in Telecommunications and Internet Converged Services and Protocols for Advanced Networking (TISPAN), and Cordless Advanced Technology-internet and quality (CAT-iq) for wireless call connection at home.

In order to exchange high-definition videos between home TVs over the UPnP Telephony service, a user exchanges and sets the other party's TV information on his/her mobile phone, and exchanges high-definition videos suitable for TVs over the broadband network.

For example, a first user's mobile phone is used by the first user to connect a first user's TV, which exists in the same network as the first user's mobile phone, and a second user's TV, which exists in the same network as a second user's mobile phone with which the first user is having a telephone conversation.

Thus, the user is required to manipulate his/her mobile phone during a telephone conversation.

SUMMARY OF THE INVENTION

The present invention has been made to address at least the above problems and/or disadvantages and to provide at least the advantages described below. Accordingly, an aspect of the present invention provides a method for controlling a mobile phone on a TV, using a method capable of invoking setting functions between mobile phones, and for connecting a direct session between another party's TV and a TV belonging to the network to which a user belongs, after discovering the TV in the network to which the other party's mobile phone belongs.

In accordance with one aspect of the present invention, an apparatus of a first mobile device is provided for establishing a parallel call session based on a 3-Box architecture. The apparatus includes a call connector for performing a voice call with a second mobile device and a message exchanger for exchanging a message. The apparatus also includes a processor for receiving connection information of a first electronic device from a first control point, generating a video call request message for requesting setup for a video call, and sending the video call request message to the second mobile device through the message exchanger. The video call request message includes the connection information of the first electronic device.

In accordance with another aspect of the present invention, a method is provided for establishing a parallel call session based on a 3-Box architecture in a first mobile device. Connection information of a first electronic device is received from a first control point. A video call request message is generated for requesting setup for a video call. The video call request message includes the connection information of the first electronic device. The video call request message is sent to a second mobile device.

In accordance with a further aspect of the present invention, an apparatus of a mobile device is provided for establishing a parallel call session based on a 3-Box architecture. The apparatus includes a call connector for performing a voice call with an originating mobile device, and a message exchanger for exchanging a message. The apparatus also includes a processor for receiving a video call request message, which includes connection information of an originating electronic device, for requesting setup for a video call from the originating mobile device, and transmitting the connection information of the originating electronic device to a control point, to request video call setup.

In accordance with yet another aspect of the present invention, a method is provided for establishing a parallel call session based on a 3-Box architecture in a mobile device. A video call request message is received for requesting setup for a video call from an originating mobile device. The video call request message comprises connection information of an originating electronic device. The connection information of the originating electronic device is transmitted to a control point, to request video call setup.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numerals. Detailed descriptions of constructions or processes known in the art may be omitted to avoid obscuring the subject matter of the present invention.

Figure 1:
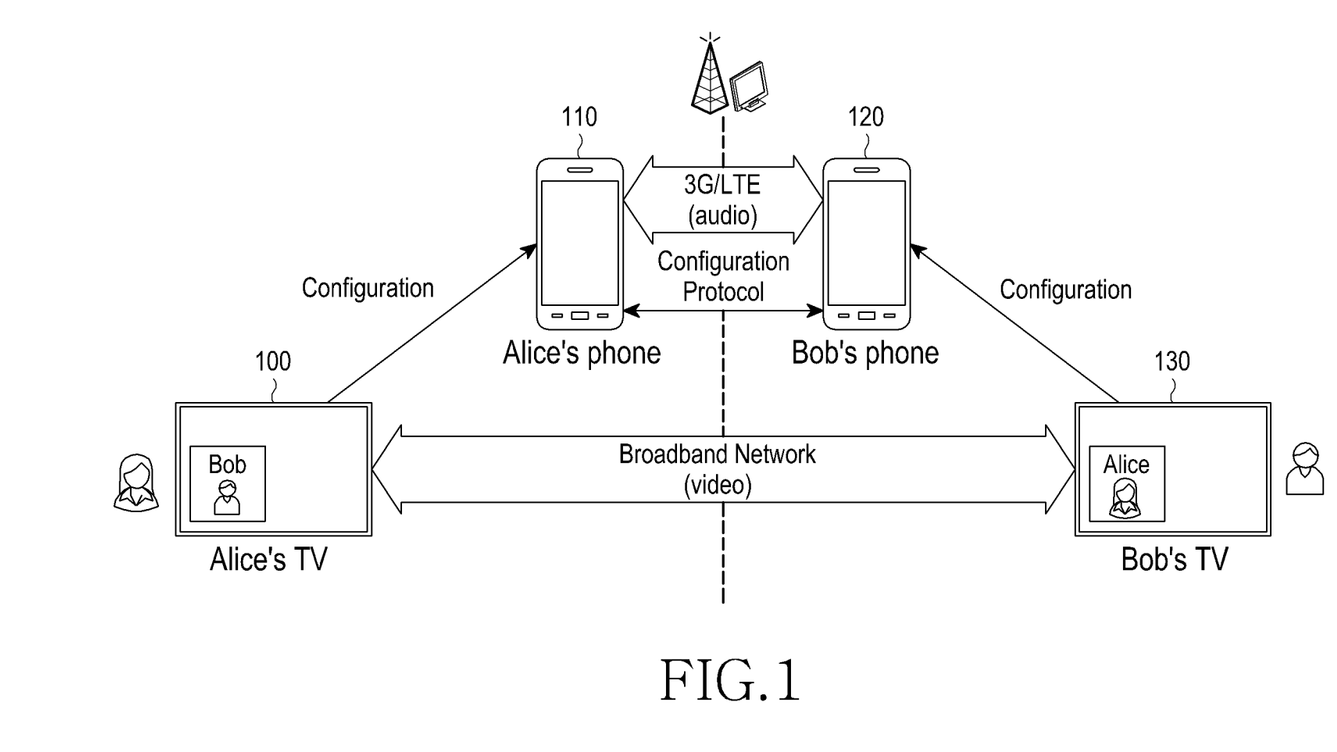
FIG. 1 is a diagram illustrating a method of connecting with another party's TV using an interface of a TV that a user is watching, upon receiving a call while watching the TV, according to an embodiment of the present invention.

FIG. 1 is a diagram illustrating a method of connecting with another party's TV using an interface of a TV that a user is watching, upon receiving a call while watching the TV, according to an embodiment of the present invention.

Figure 2:
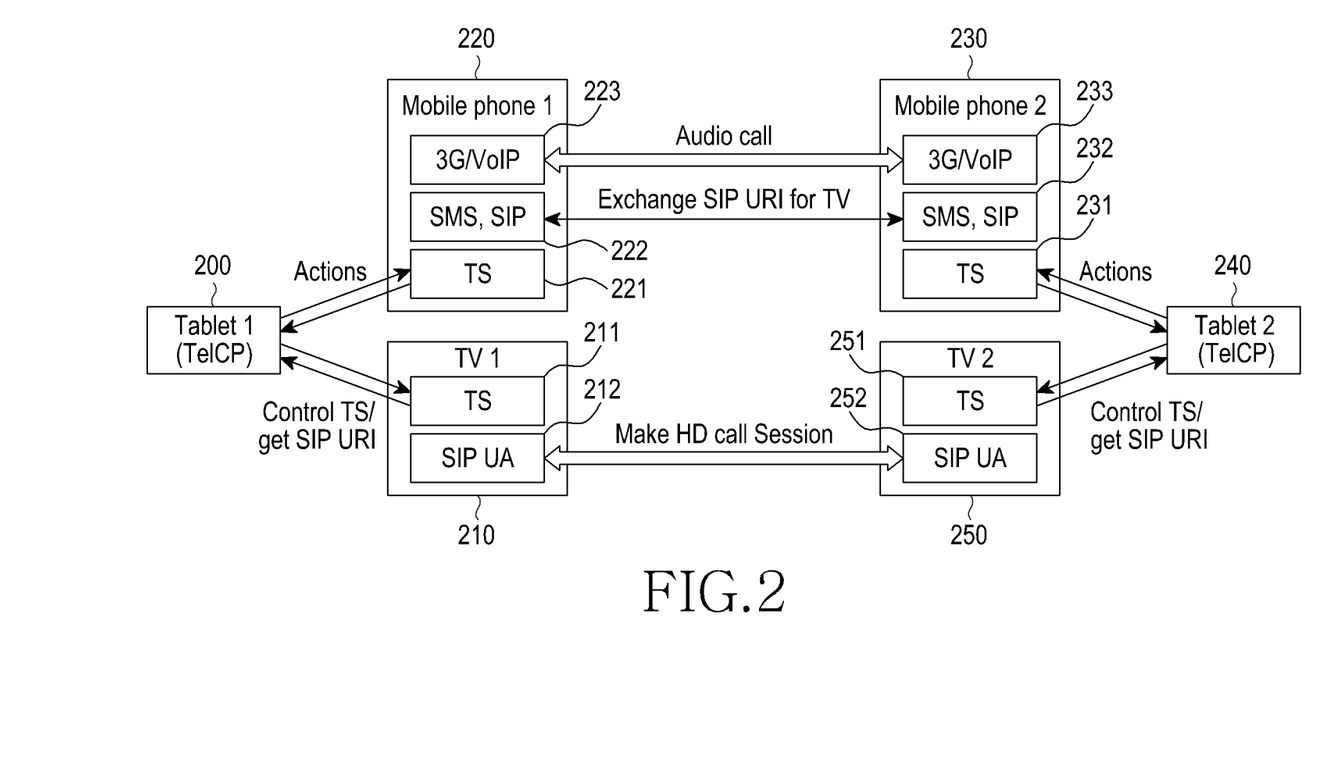
FIG. 2 is a diagram illustrating a configuration of a session setup system including mobile phones, TVs, and control points, according to an embodiment of the present invention.

Referring to FIG. 1, the user Alice discovers an Identifier (ID) of the other party Bob's phone 120 and Bob's TV 130 using Alice's TV 100 and Alice's phone 110, and connects an additional session based on the discovered ID. FIG. 2 is a diagram illustrating a configuration of a session setup system including mobile phones and TVs for session setup, and control points for controlling the TVs, according to an embodiment of the present invention.

Referring to FIG. 2, the session setup system separates a Telephony Control Point (TelCP) from each of the mobile phones based on 3-Box architecture, and provides a network interface that can use setting functions of the mobile phones. The telephony control point may be embedded in any device that can be connected to the home network, such as, for example, a mobile phone and a TV, because it is a logical software module.

The session setup system includes a Tablet 1 (TelCP) 200, a TV 1 210, a Mobile phone 1 220, a Mobile phone 2 230, a Tablet 2 (TelCP) 240, and a TV 2 250.

The Tablet 1 (TelCP) 200 controls Telephony Server (TS) 211 of the TV 1 210 and get an SIP Uniform Resource Identifier (URI) of the TV 1 210 from an SIP User Agent (UA) 212 of the TV 1 210.

The TV 1 210 includes the TS 211 and the SIP UA 212. The TS 211 sends the SIP URI of the TV 1 210 to the Tablet 1 (TelCP) 200. The SIP UA 212 connects an HD call session with the TV 2 250.

The Mobile phone 1 220 includes a TS 221, an SMS, SIP module 222 and a 3G/VoIP module 223. The TS 221 controls the SMS, SIP module 222 and the 3G/VoIP module 223. The SMS, SIP module 222 sends the SIP URI of the TV 1 210 to the Mobile phone 2 230, and receives an SIP URI of the TV 2 250 from the Mobile phone 2 230 using an SMS message or an SIP message. The 3G/VoIP module 223 connects an audio call with the Mobile phone 2 230.

The Mobile phone 2 230 includes a TS 231, an SMS, SIP module 232 and a 3G/VoIP module 233. The TS 221 controls the SMS, SIP module 232 and the 3G/VoIP module 233. The SMS, SIP module 232 receives the SIP URI of the TV 1 210 from the Mobile phone 1 220, and sends the SIP URI of the TV 2 250 to the Mobile phone 1 220 using a SMS message or an SIP message. The 3G/VoIP module 233 connects an audio call with the Mobile phone 1 220.

The Tablet 2 (TelCP) 240 controls TS 251 of the TV 2 250 and gets the SIP URI of the TV 2 250 from a SIP UA 252 of the TV 2 250.

The TV 2 250 includes the TS 251 and the SIP UA 252. The TS 251 sends SIP URI of the TV 2 250 to the Tablet 2 (TelCP) 240. The SIP UA 252 connects the HD call session with the TV 1 210.

Figure 3:
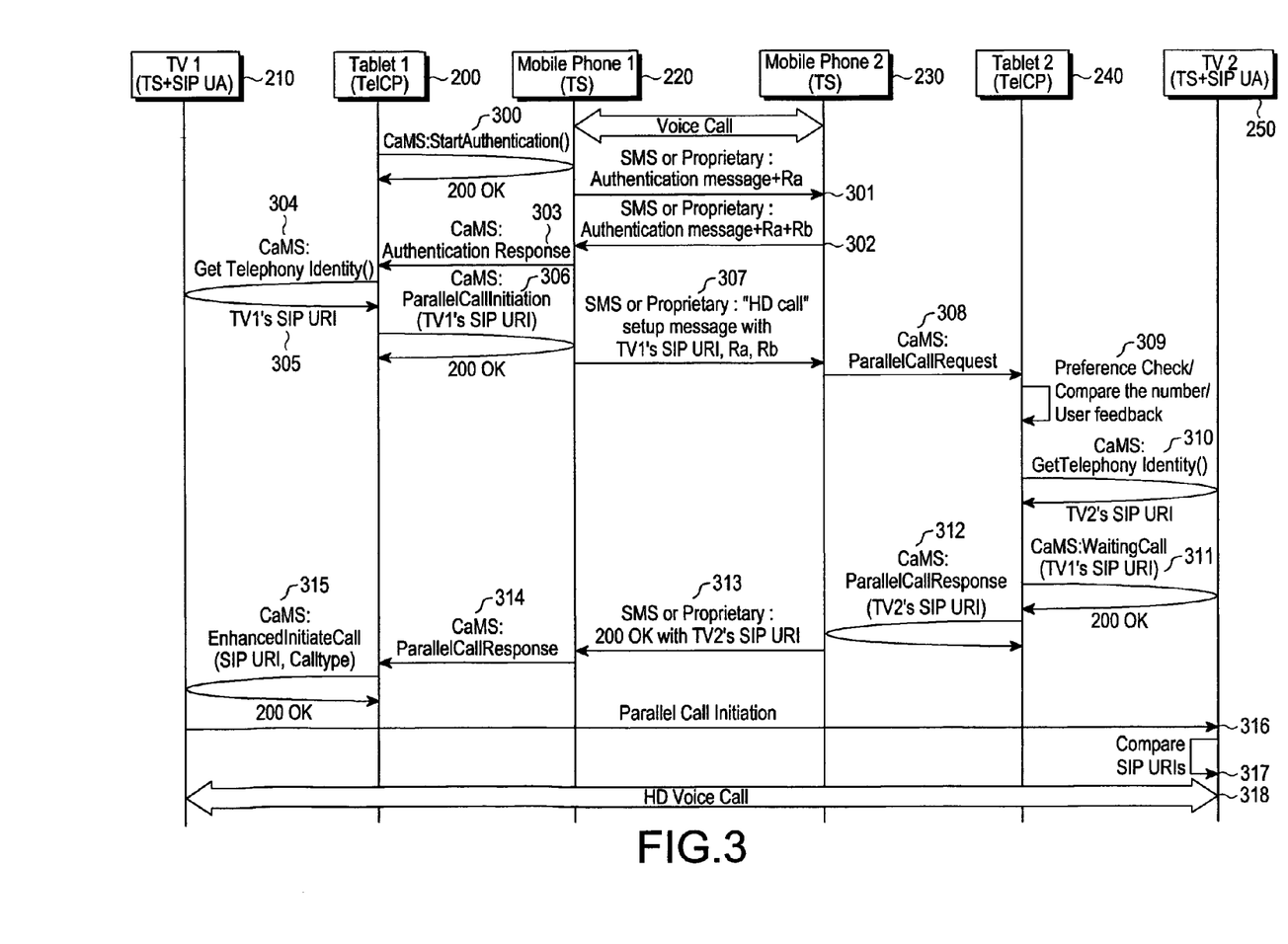
FIG. 3 is a diagram illustrating a process of setting up a session in a session setup system, according to an embodiment of the present invention.

FIG. 3 is a diagram illustrating a process of setting up a session in a session setup system, according to an embodiment of the present invention.

Referring to FIG. 3, a Mobile Phone 1 220 and a Mobile Phone 2 230 perform a voice call a Tablet 1 discovers a telephony device in the home network to which it currently belongs, using its embedded TelCP.

In step 300, the Tablet 1 (TelCP) 200 invokes a StartAuthentication( ) Action from the Mobile Phone 1 220, and in step 301, the Mobile Phone 1 220 transmits an authentication message and a random number to a Mobile Phone 2 230, using a Short Message Service (SMS) or a communication method between mobile phones.

In step 302, in response to the authentication message, the Mobile Phone 2 230 sends a response message including the received random number and a new random number to the Mobile Phone 1 220, using SMS or the communication method between mobile phones. Thereafter, when exchanging messages with each other, the mobile phones include random numbers therein to authenticate the messages. The authentication processes of steps 300 and 302 may be omitted, and operations up to step 302 may be a pre-operation for a 'new additional call' connection. Steps succeeding step 302 may be performed after the user drives the device to actually establish a 'new additional call'.

In step 303, upon receiving the response, the Mobile Phone 1 220 sends an AuthenticationResponse event to the Tablet 1 (TelCP) 200 in the same network, thereby informing the Tablet 1 (TelCP) 200 of the results of the authentication process.

In step 304, the Tablet 1 (TelCP) 200 requests a Session Initiation Protocol (SIP) Uniform Resource Identifier (URI) of a TV 1 210 to which it will connect the 'new additional call', using a GetTelephonyIdentity( ) Action.

In step 305, the TV 1 210 sends a response message including the SIP URI to the Tablet 1 (TelCP) 200, as a response to the request.

In step 306, the Tablet 1 (TelCP) 200 invokes a ParallelCallInitiation( ) Action from the Mobile Phone 1 220, and in step 307, the Mobile Phone 1 220 sends a 'new additional call' initiation message to the Mobile Phone 2 230, using SMS or the communication method between mobile phones.

In step 308, upon receiving the initiation message, the Mobile Phone 2 230 checks a random number included in the initiation message to determine whether the request has been received from an appropriate user, and sends a ParallelCallRequest event to a Tablet 2 (TelCP) 240 to inform the Tablet 2 (TelCP) 240 that an establishment request for a 'new additional call' is received from the Mobile phone 1 220 of another party.

The Mobile Phone 2 authenticates a sender. In step 309, the Tablet 2 (TelCP) 240 determines whether the request is appropriate. More specially, the Tablet 2 (TelCP) 240 performs a preference check, compares numbers, and performs a user feedback. If the request is determined to be appropriate, in step 310, the Tablet 2 (TelCP) 240 requests SIP URI of a TV 2 250 to which it will connect the 'new additional call', using a GetTelephonyIdentity( ) Action, and receives the SIP URI in response to the request.

In step 311, the Tablet 2 (TelCP) 240 transmits the SIP URI of the TV1 210 to the TV2 250 using a WaitingCall( ) Action. The TV2 250 stores the received SIP URI and waits for a call. Upon receiving a call connection request from the SIP URI, the TV2 250 automatically accepts the call connection request.

In step 312, the Tablet 2 (TelCP) 240 invokes a ParallelCallResponse( ) Action from the Mobile Phone 2 230, and in step 313, the Mobile Phone 2 230 sends a response message to the 'new additional call' initiation request to the Mobile Phone 1 220, using SMS or the communication method between mobile phones.

In step 314, upon receiving the response message, the Mobile phone 1 220 sends a ParallelCallResponse event to the Tablet 1 (TelCP) 200, informing the Tablet 1 (TelCP) 200 of the results on the 'new additional call' initiation request.

In step 315, the Tablet 1 (TelCP) 200 invokes an EnhancedInitiateCall( ) Action and transmits an SIP URI of the TV2 250 to the TV1 210.

In step 316, the TV1 210 initiates a Parallel call with the using the SIP URI of the TV2 250.

In step 317, the TV2 250 compares the SIP URI of the TV 1 210 with its stored the SIP URI, to determine whether they are identical.

If they are identical, in step 318, The TV1 210 establishes a 'new additional call' to TV2 250.

Accordingly, in accordance with an embodiment of the present invention, the user solves initiation setup for high-definition video calls using a TV without damaging his/her User Experience (UX), and may perform the same additional call setup using the TV, as well as other devices.

Figure 4:
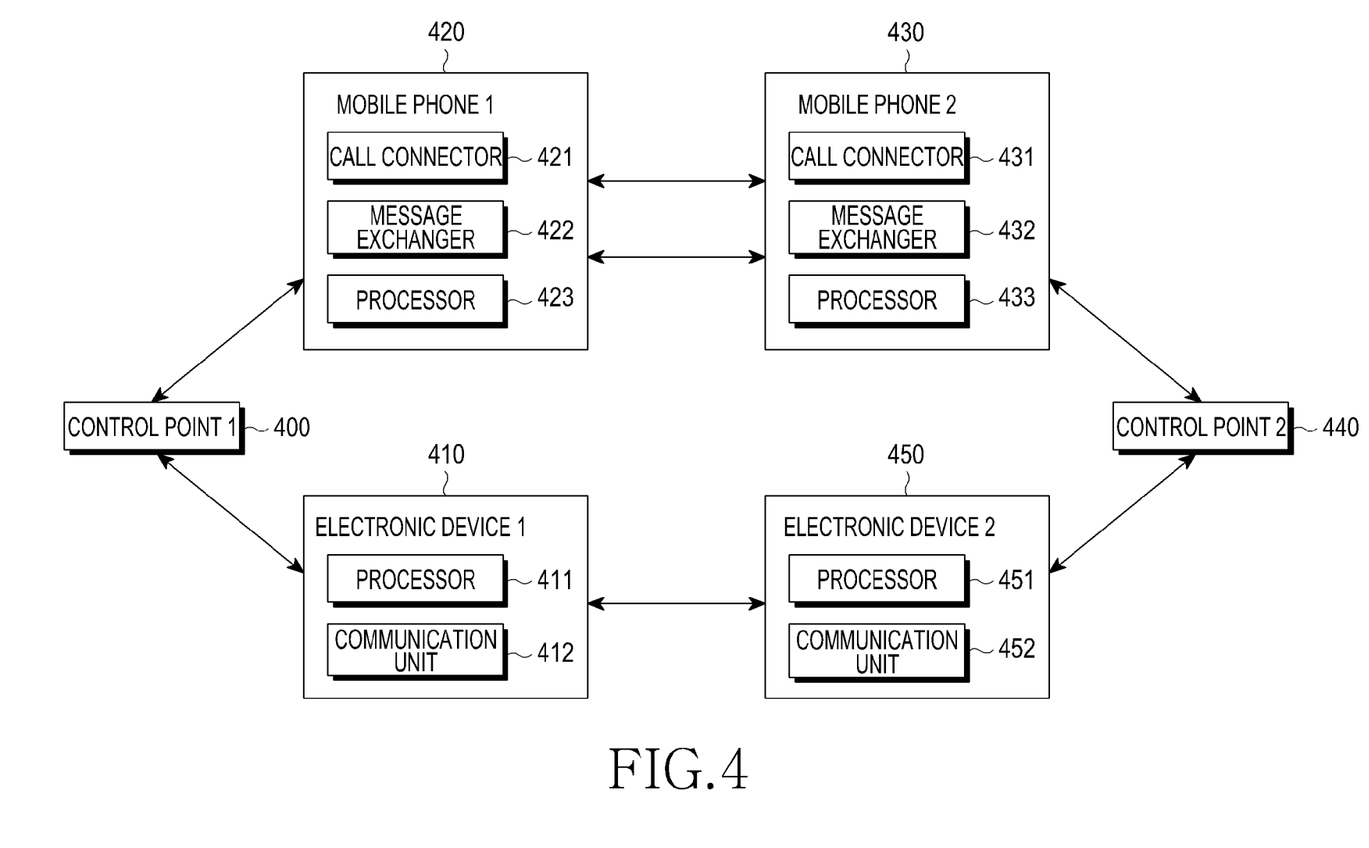
FIG. 4 is a diagram illustrating a configuration of a session setup system for connecting a video call during a voice call, according to an embodiment of the present invention.

FIG. 4 is a diagram illustrating configuration of a session setup system for connecting a video call during a voice call, according to an embodiment of the present invention.

The session setup system includes a first (or originating) control point 400, a first (or originating) electronic device 410, a first (or originating) mobile phone 420, a second mobile phone 430, a second control point 440, and a second electronic device 450.

Upon receiving a request for a video call during a voice call between the first mobile phone 420 and the second mobile phone 430, the first control point 400 requests connection information of the first electronic device 410, from the first electronic device 410. The connection information of the first electronic device 410 may be embodied as an SIP URI of the first electronic device 410. For example, if a first user wants to make a video call with a second user during his/her voice call with the second user, the first control point 400 may make it possible to connect a session between electronic devices, such as TVs, which can be used for video calls.

The first electronic device 410 includes a processor 411 and a communication unit 412. Upon receiving a request for connection information of the first electronic device 410 from the first control point 400, the communication unit 412 checks connection information of the first electronic device 410 and transmits the connection information to the processor 411. The processor 411 transmits the connection information of the first electronic device 410 to the first control point 400.

Upon receiving the connection information from the first electronic device 410, the first control point 400 invokes a ParallelCallInitiation( ) action and transmits the connection information of the first electronic device 410 to the first mobile phone 420, for video call initiation.

The first mobile phone 420 includes a call connector 421, a message exchanger 422 and a processor 423.

The call connector 421 performs voice calls with the second mobile phone 430.

The message exchanger 422 sends a video call request message to the second mobile phone 430, and receives a video call response message to the video call request message from the second mobile phone 430.

Upon receiving connection information of the first electronic device 410 from the first control point 400, the processor 423 generates a video call request message for requesting setup for a video call, using SMS or a communication method between mobile phones. The processor 423 sends the generated video call request message to the second mobile phone 430 via the message exchanger 422.

The second mobile phone 430 includes a call connector 431, a message exchanger 432, and a processor 433.

The call connector 431 performs voice calls with the first mobile phone 420.

The message exchanger 432 receives a video call request message from the first mobile phone 420, and sends a video call response message to the first mobile phone 420.

Upon receiving the video call request message from the first mobile phone 420, the processor 433 transmits connection information of the first electronic device 410 to the second control point 440, informing the second control point 440 of the reception of a setup request for a video call from the first mobile phone 420, using a ParallelCallInfo (informationType=ParallelCallRequest) event for the setup request for a video call.

If the reception of the setup request for the video from the first mobile phone 420 is informed by the second mobile phone 430, the second control point 440 performs authentication on the first mobile phone 420 and determines whether the setup request for the video call is appropriate. For example, the second control point 440 determines whether a phone number included in a request for a video call matches a phone number of a caller. If the setup request is appropriate, the second control point 440 invokes a GetTelephonyIdentity( ) action and requests connection information of the second electronic device 450 from the second electronic device 450.

The second electronic device 450 includes a processor 451 and a communication unit 452.

Upon receiving a request for connection information of the second electronic device 450 from the second control point 440 through a GetTelephonyIdentity( ) action, the processor 451 receives the connection information of the second electronic device 450 from the communication unit 452 and transmits the received connection information of the second electronic device 450 to the second control point 440.

Upon receiving the connection information of the second electronic device 450 from the second electronic device 450, the second control point 440 invokes a ParallelCallResponse( ) action in response to the setup request for a video call, and transmits the connection information of the second electronic device 450 to the second mobile phone 430.

Upon receiving connection information of the second electronic device 450 from the second control point 440 as a ParallelCallResponse( ) action invoked in response to the setup request for a video call, the processor 433 generates a video call response message including the connection information of the second electronic device 450 for the video call request message, using SMS or the communication method between mobile phones. The processor 433 sends the generated video call response message to the first mobile phone 420.

Upon receiving the video call response message to the video call request message from the second mobile phone 430, the processor 423 transmits connection information of the second electronic device 450, which is included in the video call response message, to the first control point 400, in response to the video call initiation using a ParallelCallInfo (informationType=ParallelCallAccepted) event.

The first control point 400 receives connection information of the second electronic device 450 from the first mobile phone 420 in response to the video call initiation using a ParallelCallInfo(informationType=ParallelCallAccepted) event. The connection information of the second electronic device 450 may be an SIP URI of the second electronic device 450.

The first control point 400 transmits the received connection information of the second electronic device 450 to the first electronic device 410.

Upon receiving connection information of the second electronic device 450 from the first control point 400, the processor 411 of the first electronic device 410 establishes a video call connection between the first electronic device 410 and the second electronic device 450, via the communication unit 412, based on the received connection information of the second electronic device 450.

Upon receiving a request for initiating the video call from the first electronic device 410, the processor 451 displays a screen indicating that a video call is requested by the first electronic device 410. Upon receiving an input for accepting the video call from the user, the processor 451 initiates the video call with the first electronic device 410.

In an alternative embodiment of the present invention, in order to allow the second electronic device 450 to automatically accept the call connection request, the second control point 440 may invoke a Waiting call( ) action, and transmit the connection information of the first electronic device 410 to the second electronic device 450. The processor 451 of the second electronic device 450 stores the received connection information of the first electronic device 410. Since the second electronic device 450 stores the connection information of the first electronic device 410 in advance, the second electronic device 450 may automatically connect the call by checking the connection information of the first electronic device upon receiving a video call request from the first electronic device 410. In this way, the user may automatically initiate the video call with the first electronic device 410 without an entry for a video call.

In this manner, in accordance with embodiments of the present invention, the user may perform a video call with another party on home electronic devices if desired during a voice call.

Figure 5:
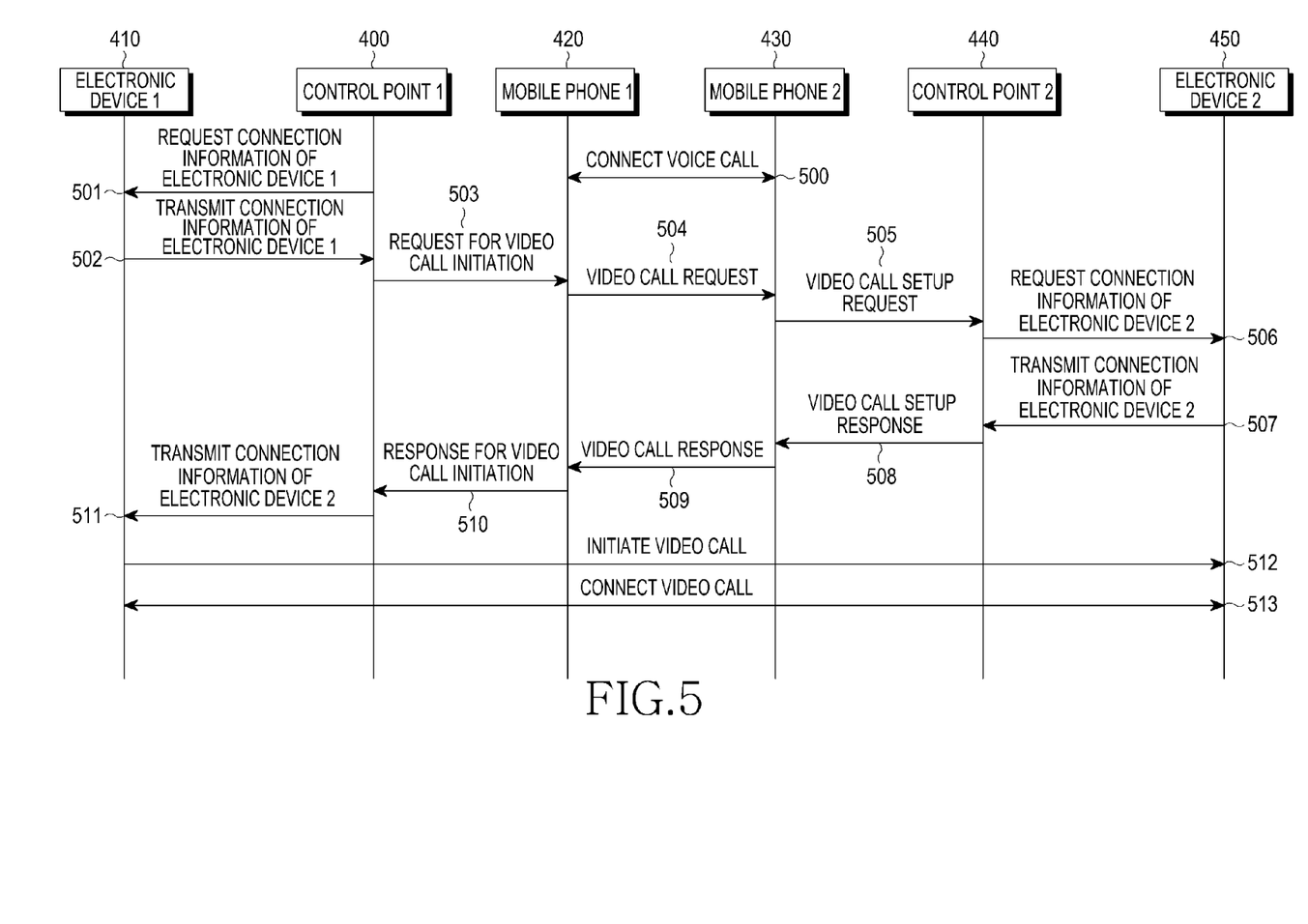
FIG. 5 is a diagram illustrating a process of connecting a video call between a first user's first electronic device and a second user's second electronic device for a video call during a user's voice call, according to an embodiment of the present invention.

FIG. 5 is a diagram illustrating a process of connecting a video call between a first user's first electronic device and a second user's second electronic device for a video call during a user's voice call, according to an embodiment of the present invention.

In step 500, the first mobile phone 420 and the second mobile phone 430 perform a voice call.

In step 501, the first control point 400 requests connection information of the first electronic device 410 from the first electronic device 410, upon request for a video call.

In step 502, the first electronic device 410 transmits connection information of the first electronic device 410 to the first control point 400.

In step 503, the first control point 400 transmits the connection information of the first electronic device 410 to the first mobile phone 420, for video call initiation, by invoking a ParallelCallInitiation( ) action.

In step 504, the first mobile phone 420 generates a video call request message, for requesting setup for a video call, and sends the generated video call request message to the second mobile phone 430.

In step 505, the second mobile phone 430 invokes a ParallelCallRequest( ) action for the setup request for a video call, and informs the second control point 440 of the reception of the setup request for the video call from the first mobile phone 420.

In step 506, the second control point 440 requests connection information of the second electronic device 450, from the second electronic device 450, by invoking a GetTelephonyIdentity( ) action.

In step 507, the second electronic device 450 transmits the connection information of the second electronic device 450 to the second control point 440.

In step 508, the second control point 440 transmits the connection information of the second electronic device 450 to the second mobile phone 430, by invoking a ParallelCallResponse( ) action in response to the setup request for a video call.

In step 509, the second mobile phone 430 generates a video call response message, including the connection information of the second electronic device 450, and sends the video call response message to the first mobile phone 420.

In step 510, the first mobile phone 420 transmits the connection information of the second electronic device 450, which is included in the video call response message, to the first control point 400, in response to the video call initiation using ParallelCallInfo (informationType=ParallelCallAccepted) event.

In step 511, the first control point 400 transmits the received connection information of the second electronic device 450 to the first electronic device 410.

In step 512, the first electronic device 410 initiates the video call with the second electronic device 450 based on the received connection information of the second electronic device 450. In step 513, the second electronic device 450 accepts a video call connection with the first electronic device 410, upon receiving an input for accepting the video call from the user.

In this manner, in accordance with an embodiment of the present invention, the user may perform a video call with another party on home electronic devices if desired during a voice call.

Figure 6:
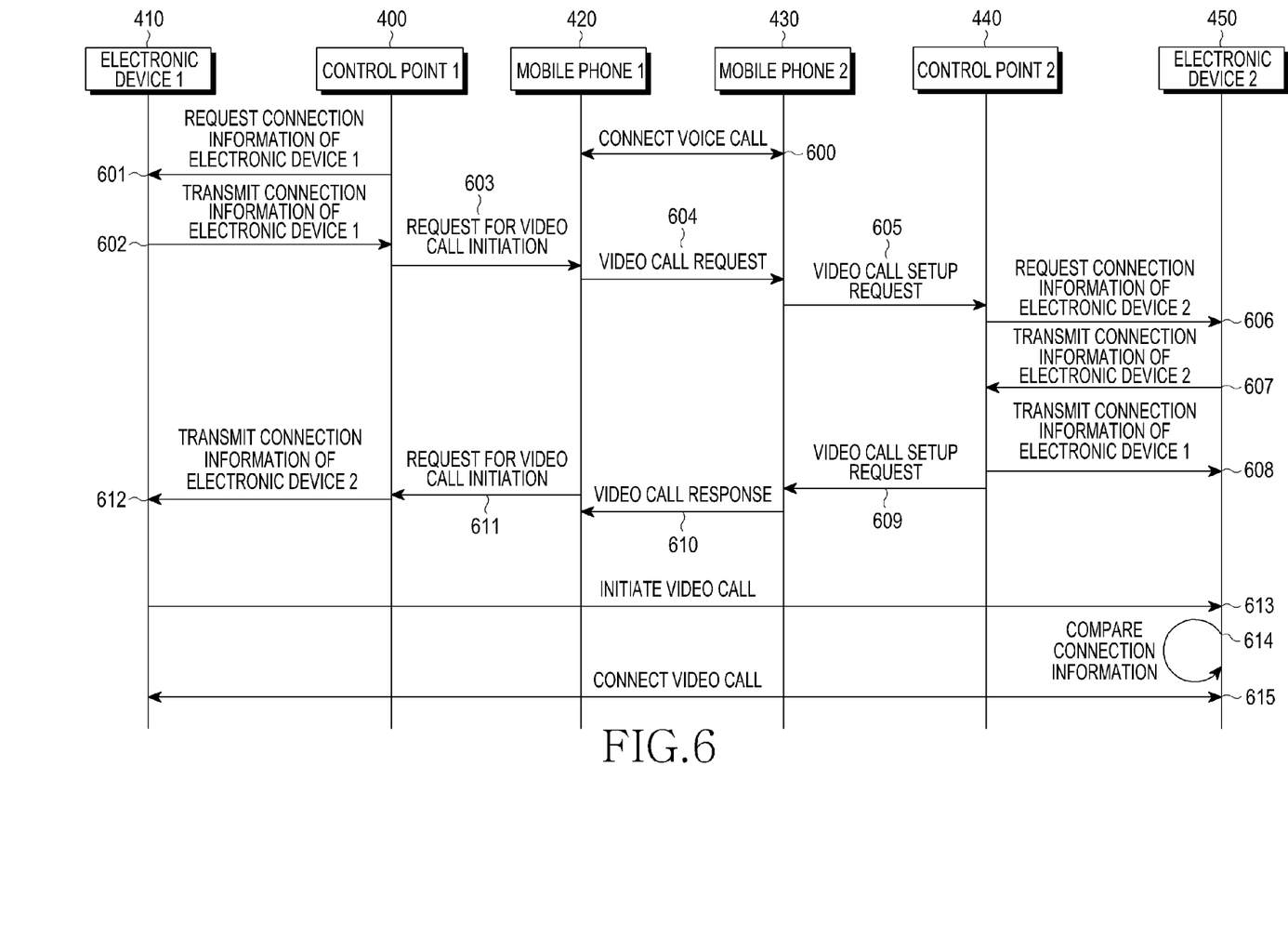
FIG. 6 is a diagram illustrating a process of connecting a video call between a first user's first electronic device and a second user's second electronic device for a video call during a user's voice call, according to another embodiment of the present invention.

FIG. 6 is a diagram illustrating a process of connecting a video call between a first user's first electronic device and a second user's second electronic device for a video call during a user's voice call, according to another embodiment of the present invention.

In step 600, the first mobile phone 420 and the second mobile phone 430 perform a voice call.

In step 601, the first control point 400 requests connection information of the first electronic device 410, from the first electronic device 410, upon request for a video call.

In step 602, the first electronic device 410 transmits the connection information of the first electronic device 410 to the first control point 400.

In step 603, the first control point 400 transmits the connection information of the first electronic device 410 to the first mobile phone 420, for video call initiation, by invoking a ParallelCallInitiation( ) action.

In step 604, the first mobile phone 420 generates a video call request message for requesting setup of a video call, and sends the generated video call request message to the second mobile phone 430.

In step 605, the second mobile phone 430 informs the second control point 440 of the reception of the setup request for a video call from the first mobile phone 420 using a ParallelCallInfo(informationType=ParallelCallRequest) event for the setup request for a video call.

In step 606, the second control point 440 requests connection information of the second electronic device 450 from the second electronic device 450 by invoking a GetTelephonyIdentity( ) action.

In step 607, the second electronic device 450 transmits the connection information of the second electronic device 450 to the second control point 440.

In step 608, in order to allow the second electronic device 450 to automatically accept a call connection request, the second control point 440 transmits the connection information of the first electronic device 410 to the second electronic device 450 by invoking a Waiting call( ) action.

In step 609, the second control point 440 transmits the connection information of the second electronic device 450 to the second mobile phone 430 by invoking a ParallelCallResponse( ) action in response to the setup request for a video call.

In step 610, the second mobile phone 430 generates a video call response message, including the connection information of the second electronic device 450, and sends the generated video call response message to the first mobile phone 420.

In step 611, the first mobile phone 420 transmits the connection information of the second electronic device 450, which is included in the video call response message, to the first control point 400 by invoking a ParallelCallReponse( ) action in response to the video call initiation.

In step 612, the first control point 400 transmits the received connection information of the second electronic device 450 to the first electronic device 410.

In step 613, the first electronic device 410 initiates the video call with the second electronic device 450 based on the received connection information of the second electronic device 450.

In step 614, the second electronic device 450 compares the connection information of the first electronic device 410 initiating the video call, with its stored connection information, to determine whether they are identical.

If the connection information of the first electronic device 410 and the stored connection information are identical, the second electronic device 450 automatically accepts the video call connection with the first electronic device 410, in step 615.

In this manner, in accordance with an embodiment of the present invention, the user may perform a video call with another party on home electronic devices if desired during a voice call.

In accordance with embodiments of the present invention, the user may solve initiation setup for high-definition video calls using a TV without interfering with a user's experience, and may perform the same additional call setup using other devices.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A first mobile device comprising:
a communication unit configured to perform a voice call with a second mobile device; and
a processor configured to:
receive a message requesting initiation of a video call from a first electronic device, wherein the message requesting initiation of the video call comprises connection information of the first electronic device, and
generate a video call request message for setting-up the video call between the first electronic device and a second electronic device, and send the video call request message to the second mobile device which communicates with the second electronic device,
wherein the video call request message comprises the connection information of the first electronic device.

2. The first mobile device of claim 1, wherein the processor receives a video call response message, which comprises connection information of the second electronic device, from the second mobile device, and transmits the connection information of the second electronic device.

3. The first mobile device of claim 2, wherein the processor transmits the connection information of the second electronic device to the first electronic device.

4. A method for controlling a first mobile device, the method comprising:
receiving a message requesting initiation of a video call from a first electronic device, wherein the message requesting initiation of the video call comprises connection information of the first electronic device;
generating a video call request message for setting-up the video call between the first electronic device and a second electronic device, wherein the video call request message comprises the connection information of the first electronic device; and
sending the video call request message to a second mobile device which communicates with the second electronic device.

5. The method of claim 4, further comprising receiving a video call response message, which comprises connection information of the second electronic device, from the second mobile device, and transmitting the connection information of the second electronic device.

6. The method of claim 5, wherein transmitting the connection information of the second electronic device comprises transmitting the connection information of the second electronic device to the first electronic device.

7. A mobile device, comprising:
a communication unit which performs a voice call with an originating mobile device; and
a processor which receives, from the originating mobile device which receives connection information of an originating electronic device, a video call request message comprising connection information of the originating electronic device and for setting up a video call between the originating electronic device and an electronic device, and transmits, to the electronic device, the connection information of the originating electronic device, to request the video call setup.

8. The mobile device of claim 7, wherein the processor further receives connection information of the electronic device.

9. The mobile device of claim 8, wherein the processor further generates a video call response message, which comprises the connection information of the electronic device, upon receiving the connection information of the electronic device, and sends the video call response message to the originating mobile device.

10. A method for controlling a mobile device, the method comprising:
- receiving a video call request message for setting up a video call from an originating mobile device which receives connection information of an originating electronic device, wherein the video call request message comprises connection information of the originating electronic device and is for setting up the video call between the originating electronic device and an electronic device; and
- transmitting the connection information of the originating electronic device to the electronic device, to request video call setup.

11. The method of claim 10, further comprising:
receiving connection information of the electronic device.

12. The method of claim 11, wherein a processor generates a video call response message, which comprises the connection information of the electronic device, upon receiving the connection information of the electronic device, and sends the video call response message to the originating mobile device.

13. A method for controlling a first control point, the method comprising:
- requesting connection information of a first electronic device;
- receiving the connection information of the first electronic device from the first electronic device;
- transmitting a message requesting initiation of a video call to a first mobile device, wherein the message requesting initiation of the video call comprises the connection information of the first electronic device and is for setting up the video call between the first electronic device and a second electronic device;
- receiving connection information of the second electronic device from the first mobile device; and
- transmitting the connection information of the second electronic device to the first electronic device.

14. A method for controlling a second control point, the method comprising:
- receiving a message requesting setup of a video call between a second electronic device and a first electronic device from a second mobile device;
- requesting connection information of the second electronic device;
- receiving the connection information of the second electronic device from the second electronic device; and
- transmitting the connection information of the second electronic device to the second mobile device, in a response message for setup of the video call between the second electronic device and the first electronic device corresponding to the message requesting setup of the video call between the second electronic device and the first electronic device.

15. The method of claim 14, further comprising:
transmitting connection information of the first electronic device to the second electronic device.

* * * * *